US009704330B2

United States Patent
Hubner et al.

(10) Patent No.: US 9,704,330 B2
(45) Date of Patent: Jul. 11, 2017

(54) IDENTITY-BASED TRIGGERS FOR CONTROLLED DISPENSING

(71) Applicant: Verizon Patent and Licensing Inc., Basking Ridge, NJ (US)

(72) Inventors: Paul V. Hubner, McKinney, TX (US); Robert A. Clavenna, Lucas, TX (US); Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 407 days.

(21) Appl. No.: 14/265,554

(22) Filed: Apr. 30, 2014

(65) Prior Publication Data

US 2015/0317860 A1   Nov. 5, 2015

(51) Int. Cl.
*G07F 17/12* (2006.01)
*G07F 11/00* (2006.01)
*G06Q 30/00* (2012.01)

(52) U.S. Cl.
CPC .............. *G07F 17/12* (2013.01); *G06Q 30/00* (2013.01); *G07F 11/002* (2013.01)

(58) Field of Classification Search
CPC ........ G07F 11/00; G07F 11/002; G07F 11/62; G07F 17/12
See application file for complete search history.

(56) References Cited

U.S. PATENT DOCUMENTS

| | | | |
|---|---|---|---|
| 9,141,931 B2 * | 9/2015 | Ackerman | G06Q 10/087 |
| 9,223,315 B2 * | 12/2015 | Irwin | G05D 3/00 |
| 2002/0035515 A1 * | 3/2002 | Moreno | A47G 29/141 340/5.73 |
| 2002/0194141 A1 * | 12/2002 | Langensteiner | G06Q 20/02 705/67 |
| 2003/0120384 A1 * | 6/2003 | Haitin | A61G 12/001 700/242 |
| 2005/0192705 A1 * | 9/2005 | Pinney | G06F 19/3462 700/241 |
| 2013/0144428 A1 * | 6/2013 | Irwin | B65G 1/0485 700/218 |
| 2013/0262251 A1 * | 10/2013 | Wan | G06Q 10/0836 705/26.1 |
| 2013/0346240 A1 * | 12/2013 | Roberts | G06Q 30/0261 705/26.9 |
| 2014/0236688 A1 * | 8/2014 | Minter | G06Q 10/0836 705/14.4 |
| 2015/0089607 A1 * | 3/2015 | Hubner | H04L 63/0838 726/6 |
| 2015/0120602 A1 * | 4/2015 | Huffman | G06Q 10/083 705/339 |

* cited by examiner

*Primary Examiner* — Gene Crawford
*Assistant Examiner* — Stephen Akridge

(57) ABSTRACT

A method, a device, and a non-transitory storage medium to store inventory information pertaining to items stored in a dispensary system; receive a request from a user via a user device to retrieve one of the items from the dispensary system; determine whether the dispensary system stores the one of the items based on the inventory information; validate an identity of the user, a location of the user, date and time, and a location of the dispensary system; determine which of the lockers of the dispensary system stores the one of the items, in response to a successful validation; transmit to the user via the user device, a message indicating one of the lockers in which the one of the items is stored; and transmit to the dispensary system, a command to open the one of the lockers.

20 Claims, 13 Drawing Sheets

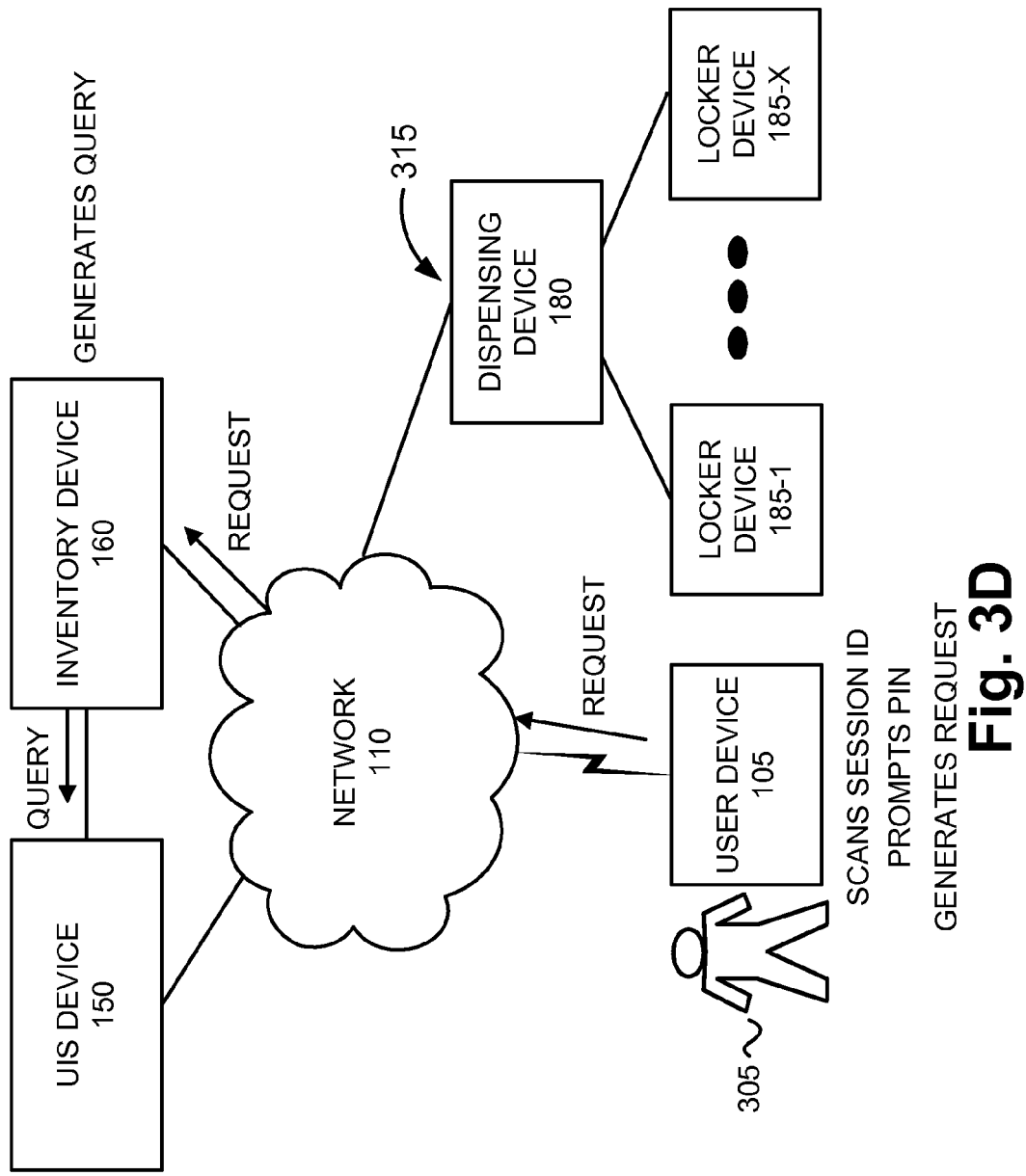

IDENTITY-BASED TRIGGERS FOR CONTROLLED DISPENSING

BACKGROUND

Dispensing devices can be used for the dispensing of medication to a user. However, various issues, such as security, accuracy, abiding by regulatory guidelines, etc., need to be addressed to facilitate the dispensing of medication.

BRIEF DESCRIPTION OF THE DRAWINGS

FIGS. 3A-3G are diagrams illustrating exemplary scenarios pertaining to an exemplary embodiment of the dispensary service.

DETAILED DESCRIPTION OF PREFERRED EMBODIMENTS

Figure 1A:
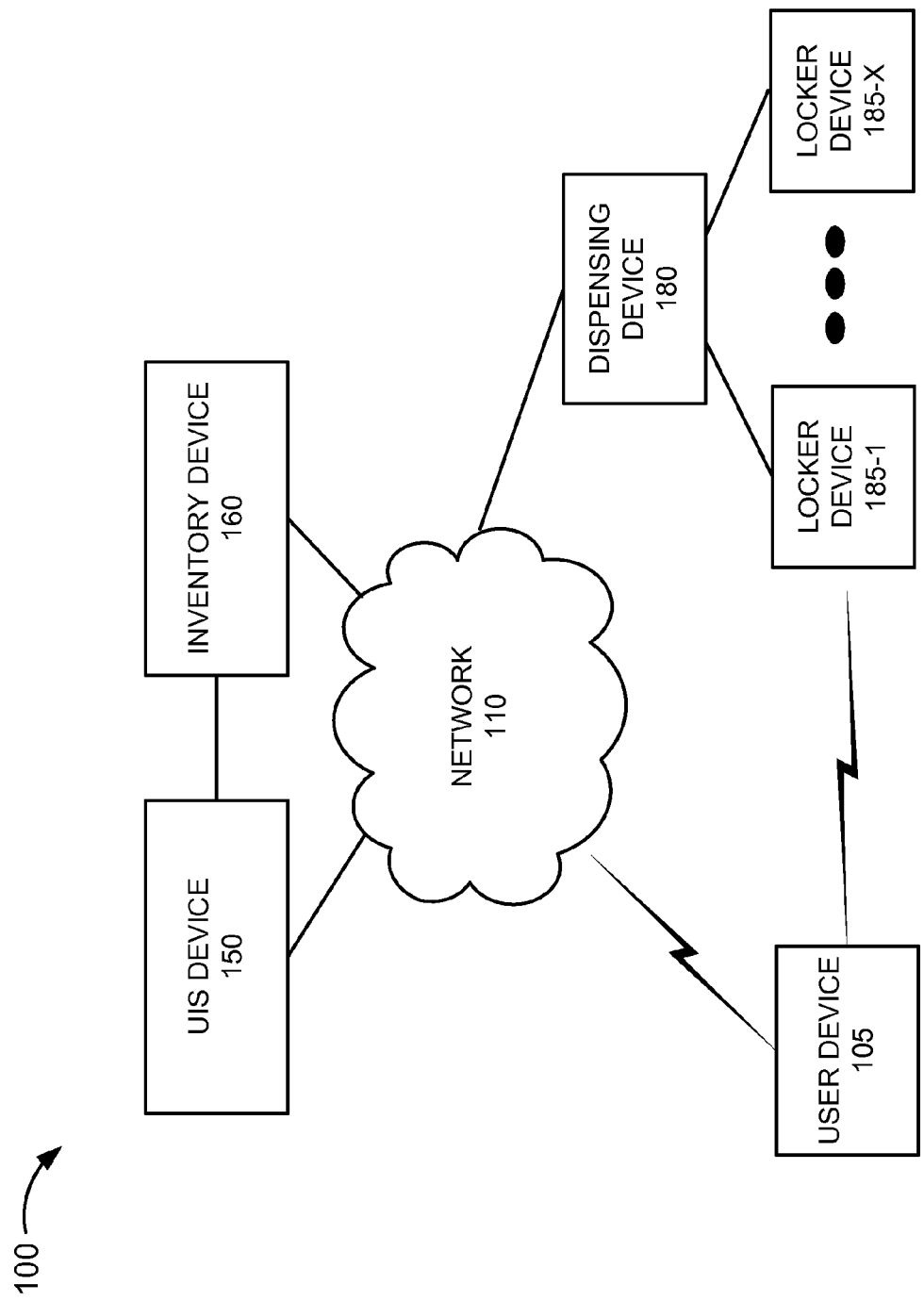
FIG. 1A is a diagram of an exemplary user device in which exemplary embodiments of a dispensing service, as described herein may be implemented.

The following detailed description refers to the accompanying drawings. The same reference numbers in different drawings may identify the same or similar elements. Also, the following detailed description does not limit the invention.

The term "medication," as used herein, refers to any type of drug, medicine, or other pharmaceutical substance. While this description describes a dispensary service that may be used for the dispensing of medications, according to other embodiments, the dispensary service may be used for the dispensing of any item, such as any retail good, mail, a package, a consumer product, etc. By way of example, a retailer of an item may use the dispensary service to allow the item to be picked up by a purchaser. According to another example, a pharmacy may use the dispensary service to allow a person to pick up medication after hours. According to yet another example, a mail delivery service may use the dispensary service to allow a person to pick up a package. For example, assume the package was unsuccessfully delivered to the person since the person was not home. The person may be notified to pick up the package at a dispensary system. According to other examples, a user may use the dispensary system to store a thing for himself/herself or someone else. That is, for example, the user may use the dispensary system as a self-storage apparatus or a temporary locker.

According to an exemplary embodiment, a network device provides a dispensing service. According to an exemplary embodiment, the dispensing service includes an identity service. The identity service identifies a user of a user device. According to an exemplary embodiment, the dispensing service includes a location service. The location service identifies a location of the user of the user device. According to an exemplary embodiment, the network device includes an inventory service. The inventory service includes the maintenance and storage of information pertaining to a dispensary system that provides safekeeping and dispensing of medications, as described herein. According to an exemplary embodiment, the inventory service manages or controls the dispensary system to allow users to retrieve medications. An exemplary network device is illustrated and described further below.

According to an exemplary embodiment, a user device provides a proximity service. For example, the proximity service includes a location-aware service that determines a geographical location of the user device. Additionally, for example, the proximity service includes a near-field proximity service that provides for communication with a dispensary system. According to an exemplary embodiment, the user device provides an identity service. In providing the identity service, the user device operates in cooperation with the network device. An exemplary user device is illustrated and described further below.

According to an exemplary embodiment, a dispensary system includes a controller device and locker devices. According to an exemplary embodiment, the controller device operates in cooperation with the network device for providing a dispensary service. According to an exemplary embodiment, the locker devices store items. For example, users may pickup items stored in locker devices after various parameters have been verified, as described herein. According to an exemplary embodiment, the parameters include the identity of the user, the location of the user, and date and time information.

FIG. 1A is a diagram of an exemplary environment 100 in which an exemplary embodiment of a dispensing service, as described herein may be implemented. As illustrated, environment 100 includes a user device 105, a network 110, a Universal Identity Service (UIS) device 150, an inventory device 160, a dispensing device 180, and lockers 185-1 through 185-X (also referred to as lockers 185 and, generally and/or individually as locker 185).

Environment 100 may be implemented to include wired, optical, and/or wireless connections among the devices and the network illustrated. A connection may be direct or indirect and may involve an intermediary device and/or an intermediary network not illustrated in FIG. 1A. Additionally, the number, type (e.g., wired, wireless, etc.), and the arrangement of connections between the devices and the network are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1A. For example, a single device in FIG. 1A may be implemented as multiple devices and/or multiple devices may be implemented as a single device. By way of further example, inventory device 160 may be implemented as multiple devices, such as a computer and an external storage device, and/or dispensing device 180 and locker device 185 may be combined into a single device. Additionally, or alternatively, environment 100 may include an additional network and/or a differently arranged network, than that illustrated in FIG. 1A. For example, environment 100 may include an intermediary network. Also, according to other embodiments, one or more functions and/or processes described as being performed by a particular device may be performed by a different device, or some combination of devices.

User device 105 includes an end user device. For example, user device 105 may be implemented as a mobile device. By way of further example, user device 105 may be implemented as a smartphone, a tablet device, a netbook device, a computer, or some other form of an end user device having computational and communicative capabilities. According to other implementations, user device 105 may be implemented as a stationary device. For example, user device 105 may be implemented as a kiosk device or integrated with dispensing device 180 or locker device 185.

According to an exemplary embodiment, user device 105 includes software that provides an identity service. For purposes of description, the software is referred to as a UIS application. The UIS application allows a user of user device 105 to invoke, on-demand, the identity service. The user of user device 105 may communicate with UIS device 150 via the UIS application. The UIS application may provide the user of user device 105 with various interfaces to facilitate the identification and/or verification of the user's identity.

According to an exemplary embodiment, user device 105 includes software that provides a presence detection service. For purposes of description, the software is referred to as a presence detection application. The presence detection application allows user device 105 to recognize the presence of dispensing device 180 and/or allow dispensing device 180 to recognize the presence of user device 105. As an example, if the user of user device 105 were to walk into a store that includes dispensing device 180 and lockers 185, the presence detection application may notify the user that a dispensary system (i.e., dispensing device 180 and lockers 185) is on site. The presence detection application may communicate with dispensing device 180 and provide various interfaces to facilitate the pick-up of medication stored in locker device 185. While the UIS application and the presence detection application have been described separately, the functionality associated with these applications may be implemented within a single application. User device 105 is described further below.

Network 110 includes a network that provides access to and use of a dispensing service. For example, network 110 may be implemented as a public network, a private network, a wired network, or a wireless network. By way of further example, network 110 may be implemented as an Internet Protocol (IP) network, a wide area network (WAN), a metropolitan area network (MAN), a portion of the Internet, a cloud network, a mobile network, some combination thereof, etc.

UIS device 150 includes a network device that provides an identity service. The identity service includes authenticating users using various authentication procedures. For example, users may perform an on-boarding with UIS device 150 in which information pertaining to the identities of the users is obtained. UIS device 150 performs a verification of the identities of the users based on the information obtained during the on-boarding. UIS device 150 provides the identity service on-demand to users that have been successfully validated. UIS device 150 may offer various levels of authentication. As an example, the level of authentication for verifying the identity of the user that prescribes medication may be different than the level of authentication for verifying the identity the user that wishes to access a web site.

UIS device 150 allows a user (e.g., a registered user of the identity service) to invoke the identity service on-demand via the UIS application resident on user device 105. UIS device 150 may use conventional measures to authenticate the user. Upon successfully validating the identity of the user, UIS device 150 generates data (e.g., a token, etc.) which indicates that the user has been successfully authenticated. UIS device 150 may transmit the data to the user via user device 105, to a third party, or both. The data may have a short time-to-live (e.g., ability to use once). UIS device 150 is described further below.

Inventory device 160 includes a network device that provides an inventory service. The inventory service provides an inventory of medications stored by dispensary systems. For example, inventory device 160 includes a database that stores inventory information. Described below is an exemplary table that stores exemplary inventory information.

Figure 1B:
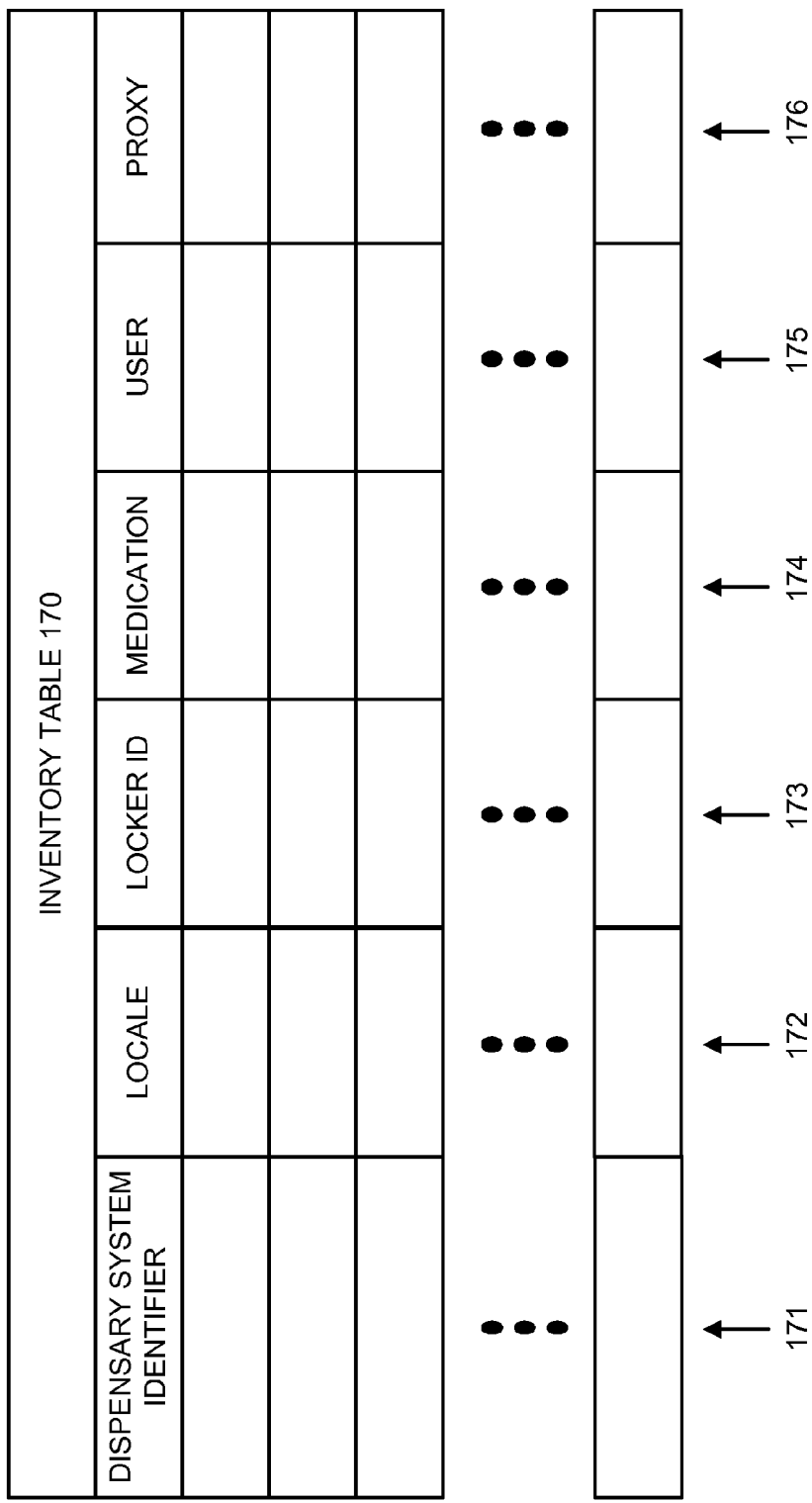
FIG. 1B is a diagram illustrating an exemplary inventory table that stores exemplary inventory information.

FIG. 1B is a diagram illustrating an exemplary inventory table 170 that stores exemplary inventory information. As illustrated, inventory table 170 includes a dispensary system identifier field 171, a locale field 172, a locker identifier field 173, a medication field 174, a user field 175, and a proxy field 176. According to other implementations, inventory table 170 may include additional fields, fewer fields, and/or different fields that store inventory information. That is, generally speaking, the inventory information may include any information that may be useful in the management of dispensing medication to users via a dispensary system. In this regard, as indicated by the exemplary fields of table 170, information as to where the medication is stored, for whom, what is stored, etc., may be considered pertinent to the dispensing of medication, or for that matter any item.

Dispensary system identifier field 171 stores information indicating an identifier of the dispensary system. For example, dispensary system identifier field 171 may store a string that uniquely identifies dispensing device 180. As described further below, there may be multiple dispensary systems (e.g., dispensing devices 180 and locker device 185) located at various locations (e.g., nationally, in a city, etc.). Dispensary system identifier field 171 may store other information, such as network address of dispensing device 180, etc.

Locale field 172 stores information indicating a location of a dispensary system. For example, the location information may include a longitude and latitude, a state, a city, and a zip code, an address (e.g., 155 State Street), etc. Locker identifier field 173 stores information indicating an identifier of each locker 185 of the dispensary system. For example, locker identifier field 173 may store a unique string that uniquely identifies locker device 185.

Medication field 174 stores information indicating the medication housed by locker 185. By way of example, medication field 174 may store information indicating that Ambien is housed in locker 185. Medication field 174 may store more detailed information pertaining to the medication, such as the number of tablets, the number of ounces, or other information pertaining to a prescription of the medication. User field 175 stores information indicating the user to whom the medication belongs. For example, user field 175 may store the user's name and/or other personal information that may be useful in identifying the user. Proxy field 176 stores information indicating the proxy user to whom has authorization to pick up the medication on behalf of the user to whom the medication belongs. For example, proxy field 176 may store the proxy user's name and/or other personal information that may be useful in identifying the proxy user. By way of further example, there may be instances when an elderly parent gives permission to his/her son or daughter to pick up medication at the dispensary system.

Inventory device 160 may obtain and store inventory information based on information provided by various entities. For example, if a mail service provider (e.g., FedEx, USPS, UPS, DHL, etc.) places the medication in locker device 185, inventory information may be obtained from the mail service provider. Alternatively, if a pharmacy provider (e.g., CVS, Walgreens, etc.) decides to place medication in locker device 185 for pickup by its customers, inventory information may be obtained from the pharmacy provider. While these examples are not intended to be exhaustive, inventory device 160 may obtain the inventory information and store this information to assist in the safe and secure dispensing of medication to users.

Inventory device 160 allows a user of user device 105 to query inventory device 160 so as to ascertain whether a dispensary system is storing medication on behalf of the user. Inventory device 160 uses the inventory information to respond to such a query. Inventory device 160 communicates with dispensing device 180. For example, inventory device 160 may control the dispensing of medication to a user based on inventory information, as well as other information (e.g., location of user, etc.), as described herein. Inventory device 160 is described further below.

Referring back to FIG. 1A, dispensing device 180 controls the dispensing of medication via lockers 185. As previously mentioned, a dispensary system may include a dispensing device 180 and multiple lockers 180. A set of dispensary systems may be located at various sites or venues to allow users to safely and securely pick up medications or other types of items. Dispensing device 180 controls the opening of lockers 185. Dispensing device 180 monitors the state of each locker 185 (e.g., whether locker 185 is ajar, closed, open, etc.). Dispensing device 180 may receive instructions from inventory device 160 directed towards the dispensing of medications or other items to users. Dispensing device 180 is described further below.

Locker device 185 includes a device that houses or stores medication or other types of items. Locker device 185 is controlled by dispensing device 180. Locker device 185 may include a display. For example, the display may present a user interface to a user. Locker device 185 is described further below.

Figure 2:
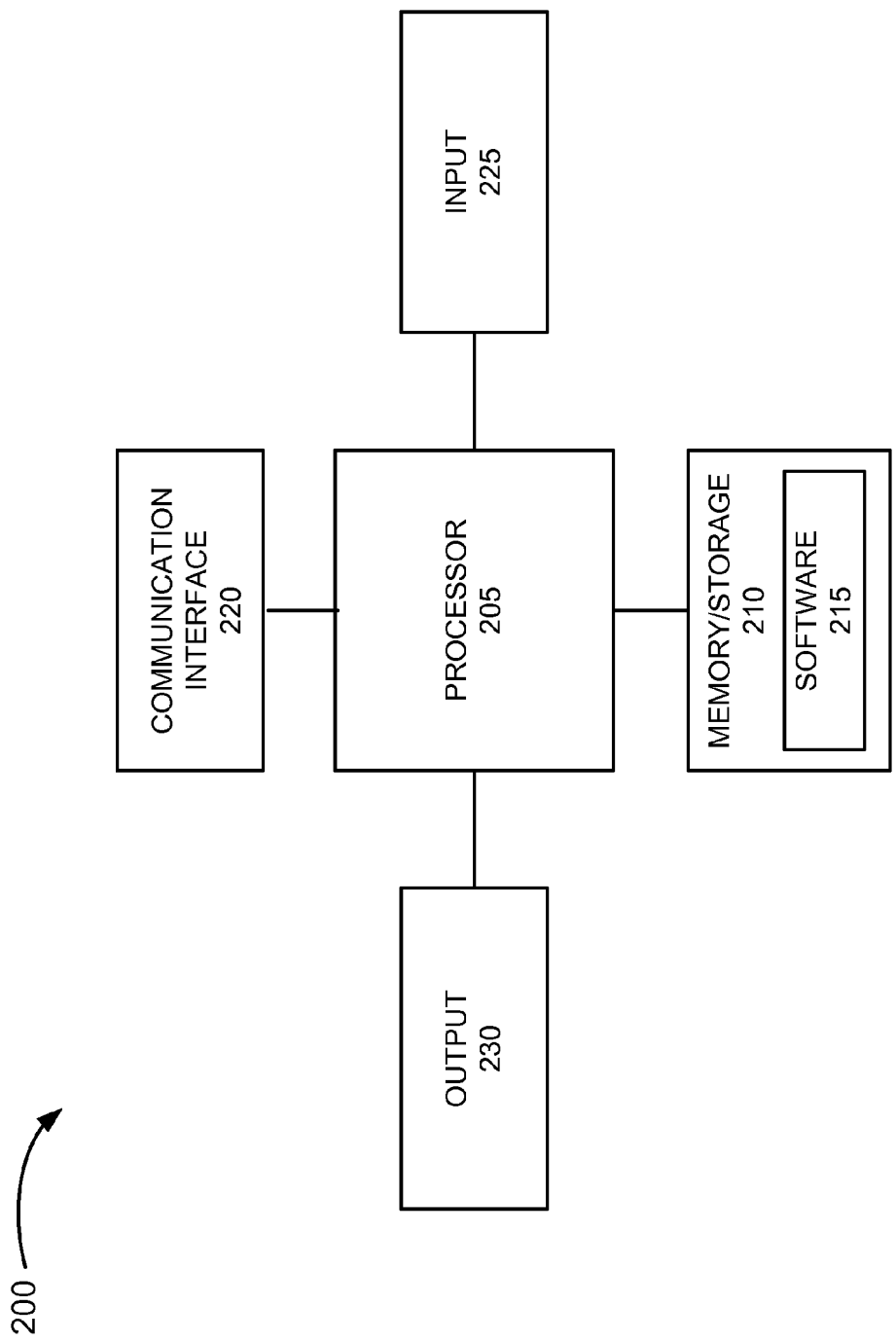
FIG. 2 is a diagram illustrating exemplary components of the user device.

FIG. 2 is a diagram illustrating exemplary components of a device 200 that may correspond to one or multiple devices in environment 100. As illustrated, device 200 includes a processor 205, memory/storage 210 that stores software 215, a communication interface 220, an input 225, and an output 230. According to other embodiments, device 200 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., cache, etc.), etc.

Processor 205 may control the overall operation or a portion of operation(s) performed by device 200. Processor 205 may perform one or multiple operations based on an operating system and/or various applications or programs (e.g., software 215). Processor 205 may access instructions from memory/storage 210, from other components of device 200, and/or from a source external to device 200 (e.g., a network, another device, etc.).

Memory/storage 210 includes one or multiple memories and/or one or multiple other types of storage mediums. For example, memory/storage 210 may include one or multiple types of memories, such as, a random access memory (RAM), a dynamic random access memory (DRAM), a cache, a read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 210 may store data, software, an operating system, and/or instructions related to the operation of device 200.

Software 215 includes an application or a computer program that provides a function and/or a process. For example, with reference to user device 105, software 215 includes the UIS application and the presence detection application. Additionally, for example, with reference to UIS device 150, software includes a user identity and/or authentication application. Additionally, for example, with reference to inventory device 160, software 215 includes an inventory and dispensing application. Additionally, for example, with reference to dispensing device 180, software 215 includes a dispensary application. Additionally, for example, with reference to locker device 185, software 215 includes a locker application. Software 215 may include firmware. Software 215 may include an operating system (OS).

Communication interface 220 permits device 200 to communicate with other devices, networks, systems, etc. Communication interface 220 may include one or multiple wireless interfaces and/or wired interfaces. Communication interface 220 may include one or multiple transmitters and receivers or transceivers. Communication interface 220 may operate according to a protocol and a communication standard. Communication interface 220 may include a Global Positioning System (GPS) receiver or other suitable receiver to provide a location service and/or a navigation service.

Input 225 permits an input into device 200. For example, input 225 may include a keyboard, a mouse, a display, a touchscreen, a touchless screen, a button, a switch, an input port, speech recognition logic, and/or some other type of visual, auditory, tactile, etc., input component. Input 225 may include a compass, a gyroscope, an accelerometer, and/or a motion sensor. Output 230 permits an output from device 200. For example, output 230 may include a speaker, a display, a touchscreen, a touchless screen, a light, an output port, and/or some other type of visual, auditory, tactile, etc., output component.

Device 200 may perform a process and/or a function, as described herein, in response to processor 205 executing software 215 stored by memory/storage 210. By way of example, instructions may be read into memory/storage 210 from another memory/storage 210 (not shown) or read from another device (not shown) via communication interface 220 into memory/storage 210. The instructions stored by memory/storage 210 may cause processor 205 to perform a process described herein. Alternatively, for example, according to other implementations, device 200 may perform a function or a process described herein based on the execution of hardware (processor 205, etc.).

As previously described, a user of the dispensary service may pick up medication from a dispensary system. According to an exemplary embodiment, this process includes verifying the identity of the user, verifying the location of the user, verifying the location of the medication, and verifying date and time. Described below is an exemplary scenario pertaining to an exemplary process by which the dispensary service may be implemented in environment 100.

Figure 3A:
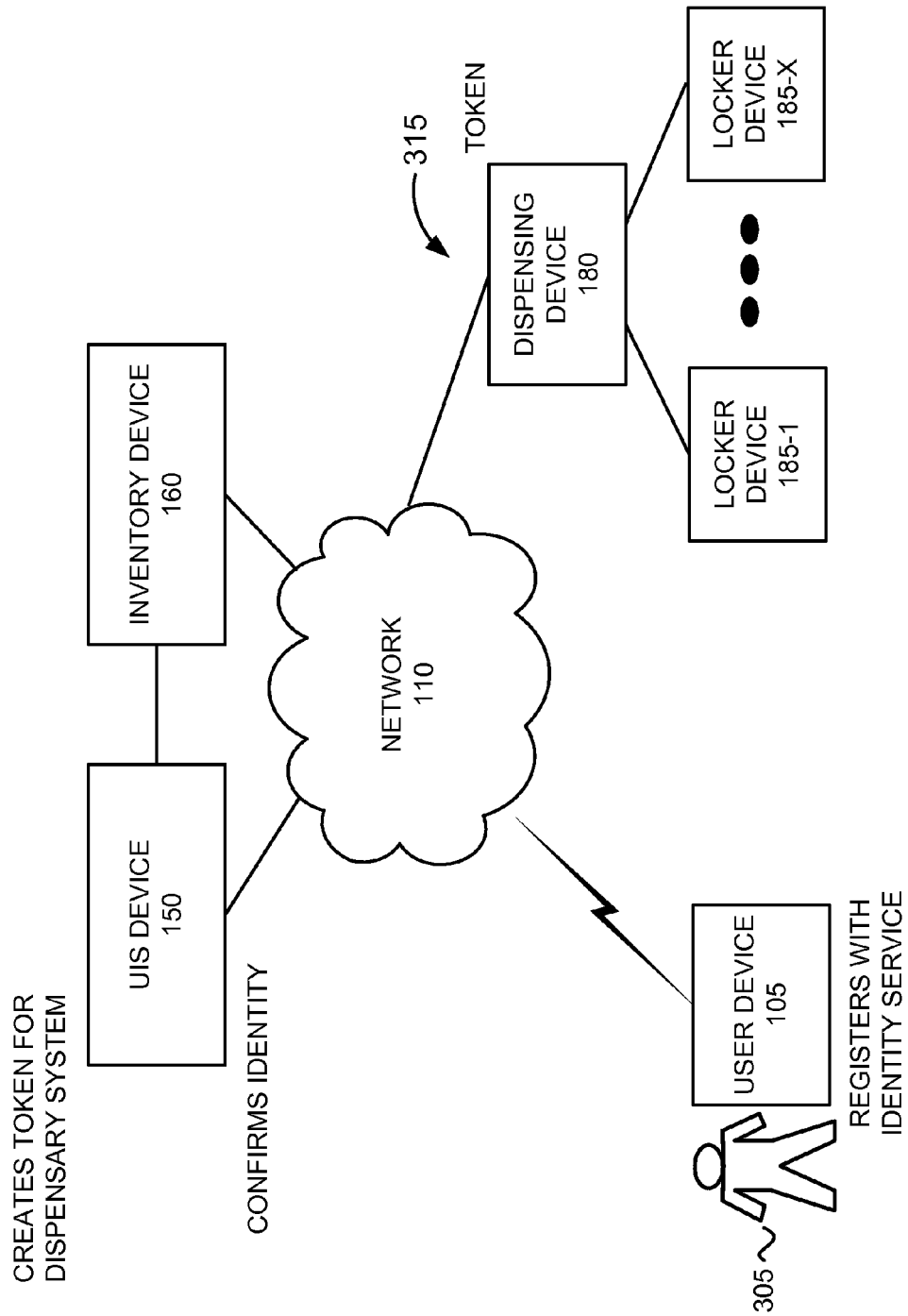

FIGS. 3A-3F are diagrams illustrating an exemplary scenario pertaining to an exemplary embodiment of the dispensary service. Referring to FIG. 3A, assume a user 305 operates user device 105. User 305 registers with the identity service provided by UIS device 150 via user device 105 and network 110 (e.g., a Long Term Evolution (LTE) network). During the on-boarding or registration process, UIS device 150 confirms the identity of user 305. UIS device 150 assigns user 305 a universal identifier. The universal identifier (e.g., a UIS token, such as a unique string) is stored on user device 105 and may be automatically updated by UIS device 150. User device 105 obtains the UIS application, which allows, among other things, user 305 to invoke the identity service, on-demand. Additionally, as illustrated, UIS device 150 creates a token (e.g., a one-time session identifier) for a dispensary system 315, which includes dispensing device 180 and lockers 185. Dispensing device 180 obtains the token. The token represents a unique session identifier. As described further below, the session identifier may be implemented as a Quick Response (QR code) which may be obtained by the user. For example, dispensing device 180 may display the session identifier to allow user 305 to scan the session identifier via user device 105. The session identifier may timeout if no user 305 uses the session identifier and UIS device 150 may provide new session identifiers as needed. Additionally, assume that a person has placed medication belonging to user 305 in locker device 185-1.

Figure 3B:
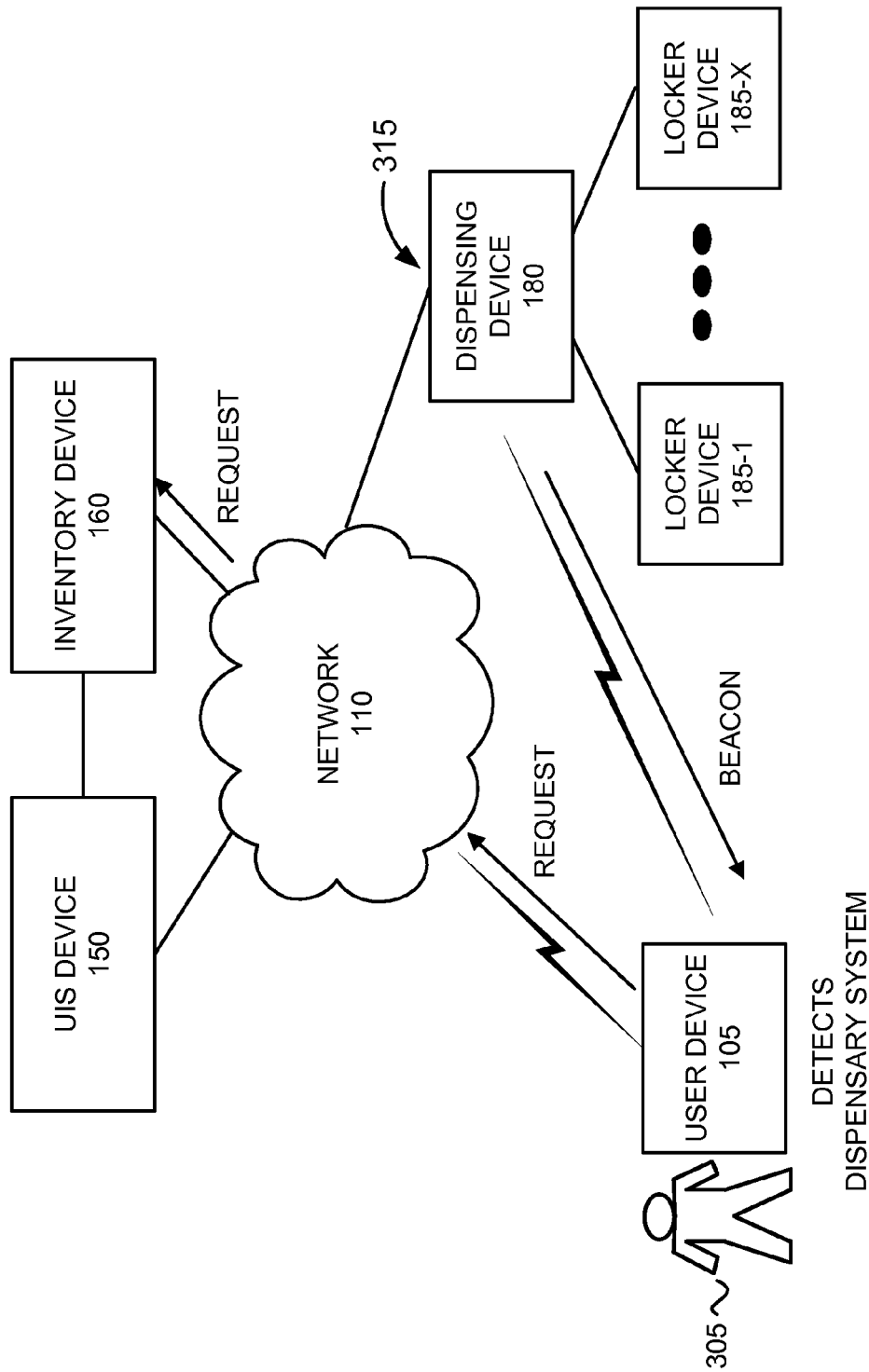

Referring to FIG. 3B, assume user 305 has been notified that the medication has been delivered to dispensary system 300. For example, user 305 may be notified via an e-mail, a text message (e.g., a Short Messaging Service (SMS) message, a Multimedia Messaging Service (MMS) message, etc.), a telephone call, a web page, the presence detection application, etc. Thereafter, user 305 enters the locale of dispensing system 315. For example, assume that user 305 enters a store (e.g., a pharmacy) that hosts dispensary system 315. Subsequently, the presence and detection application of user device 105 detects the presence of dispensary system 315. For example, user device 105 and dispensing device 180 communicates wirelessly using a suitable wireless technology (e.g., Bluetooth low energy (LE), Radio Frequency (RF), etc.). According to an exemplary implementation, dispensing device 180 transmits a beacon. The beacon may include information (e.g., a unique identifier) indicating inventory device 160 as the management system governing dispensary system 315.

In response to receiving the beacon, user device 105 transmits a request to inventory device 160. The request may include information pertaining to the location of user 305 and information that identifies user 305. The request may include information pertaining to the notification, which user 305 received, indicating that the medication is available for pick-up. For example, the notification information may include a tracking identifier, a confirmation number, and/or other information pertaining to the delivery and/or placement of the medication in a dispensary system (e.g., dispensary system 315). The request may also include a date and timestamp. In this way, even though user 305 may have been notified that an item is waiting to be picked up, this request may provide assurance that the item is still available for pickup.

Figure 3C:
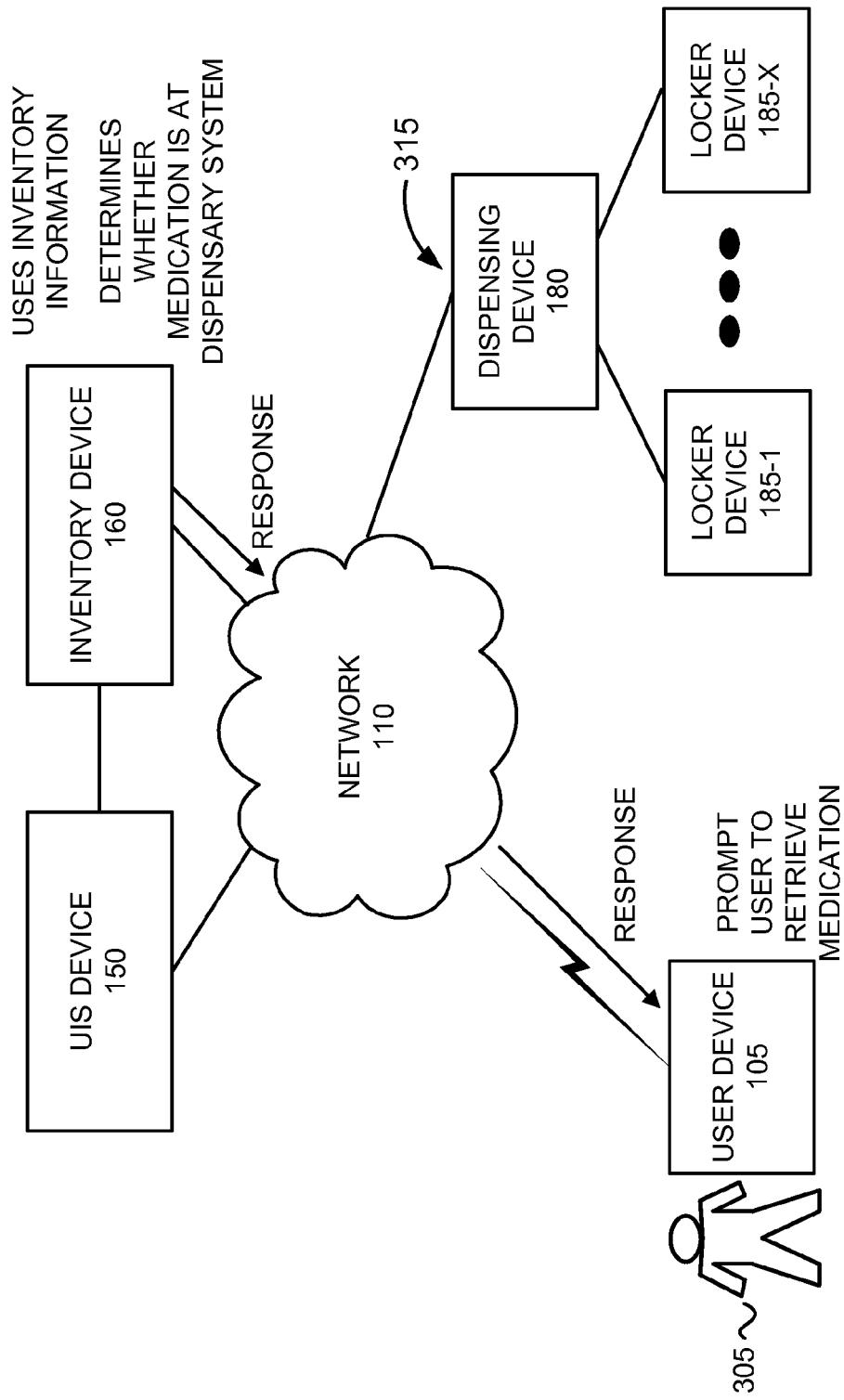

Referring to FIG. 3C, in response to receiving the request, inventory device 160 uses information included in the request to query inventory information (e.g., stored in inventory table 170). For example, inventory device 160 may use information included in the request as a key to search inventory table 170. If inventory device 160 determines that the medication is stored by dispensary system 315, then inventory device 160 generates a response that indicates the medication is stored at dispensary system 315. If inventory device 160 determines that the medication is not stored by dispensary 315, then inventory device 160 generates a response that indicates the medication is not stored at dispensary system 315. In either case, inventory device 160 transmits the response to user device 105. In the event that inventory device 160 determines that the medication is not stored at dispensary system 315, the response indicates to user 305 that there is no medication at dispensing system 315 during this time. In this example, assume that inventory device 160 determines that the medication is stored at dispensary system 315.

As illustrated, in response to receiving the response, user device 105 may prompt user 305 to retrieve the medication from dispensing system 315. For example, the presence and detection application provides a user interface that indicates that both user 305 and the medication package are simultaneously at dispensary system 315.

Referring to FIG. 3D, user 305 indicates, via user device 105 (e.g., via a user interface of the presence and detection application), that he/she wishes to retrieve the medication. In response, user device 105 (e.g., via a user interface) allows the user to generate a request to access locker 185. According to an exemplary implementation, dispensary system 315 displays a static, dynamic, or single use quick response (QR) code. The QR code may be updated by UIS device 150, as needed. User 305 scans the QR code via user device 105. For example, user device 105 includes a reader application. The QR code may constitute a session identifier. According to an exemplary implementation, user 305 provides information that identifies user 305 such as, name and age. Additionally, for example, user device 105 prompts user 305 for an access code to the identity service of UIS device 150. User 305 provides an access code (e.g., a PIN). User device 105 generates a request. According to this example, the request includes the QR code and user information (e.g., age, name, the UIS token, and access code). The request includes the location of user device 105, a beacon identifier (e.g., which identifies dispensing device 180), and date and timestamp. As illustrated, user device 105 transmits the request to inventory device 160.

Figure 3E:
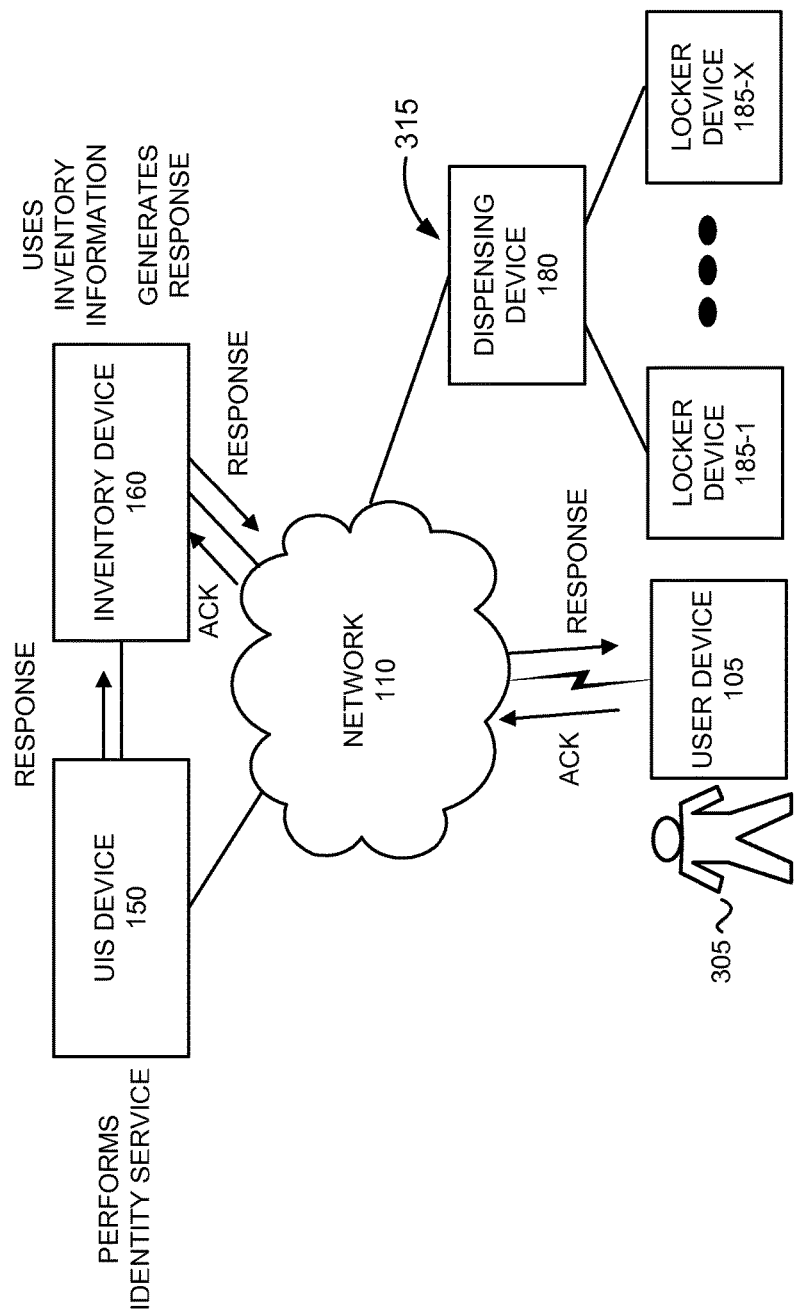

In response to receiving the request, inventory device 160 generates a query directed to the identity service provided by UIS device 150. For example, the query includes the user information (e.g., user name, age, and access code). The query may also include QR code and/or information from the QR code (e.g., without the graphic). Referring to FIG. 3E, in response to receiving the query, UIS device 150 performs the identity service based on the information included in the query. For example, UIS device 150 validates the universal ID of user 305. Based on the outcome of the verification process, UIS device 150 generates and transmits a response. For example, the response indicates whether user 305 has been successfully validated. In this example, assume that UIS device 150 successfully validates the identity of user 305. However, in the event user 305 is not successfully validated, user 305 would be informed and would not be unable to retrieve the medication.

Based on receiving the response from UIS device 150, inventory device 160 correlates other parameters (e.g., user device 105 location, date and time, dispensary system 315 location) to complete the verification process. When all of these factors are validated, inventory device 160 uses the inventory information to identify the locker 185 in which the medication for user 305 is stored. For example, inventory device 160 identifies the particular locker 185 based on locker identifier field 173. Subsequently, inventory device 160 generates a response. The response includes information indicating the locker 185 (e.g., locker 185-1) that stores the medication on behalf of user 305. Inventory device 160 transmits the response to user 305 via network 110.

Based on receiving the response, user device 105 indicates to user 305 the particular locker 185. As an example, the presence and detection application may help navigate user 305 to locker 185 so that user 305 is within a controlled distance (e.g., 1 meter or less) from locker 185. For example, the presence and detection application may provide range information and screen indicators. Dispensary system 315 may emit a micro-beacon signal. Alternatively, user device 105 may indicate a locker number (e.g., 445). According to such an implementation, each locker 185 may display a locker number.

Figure 3F:
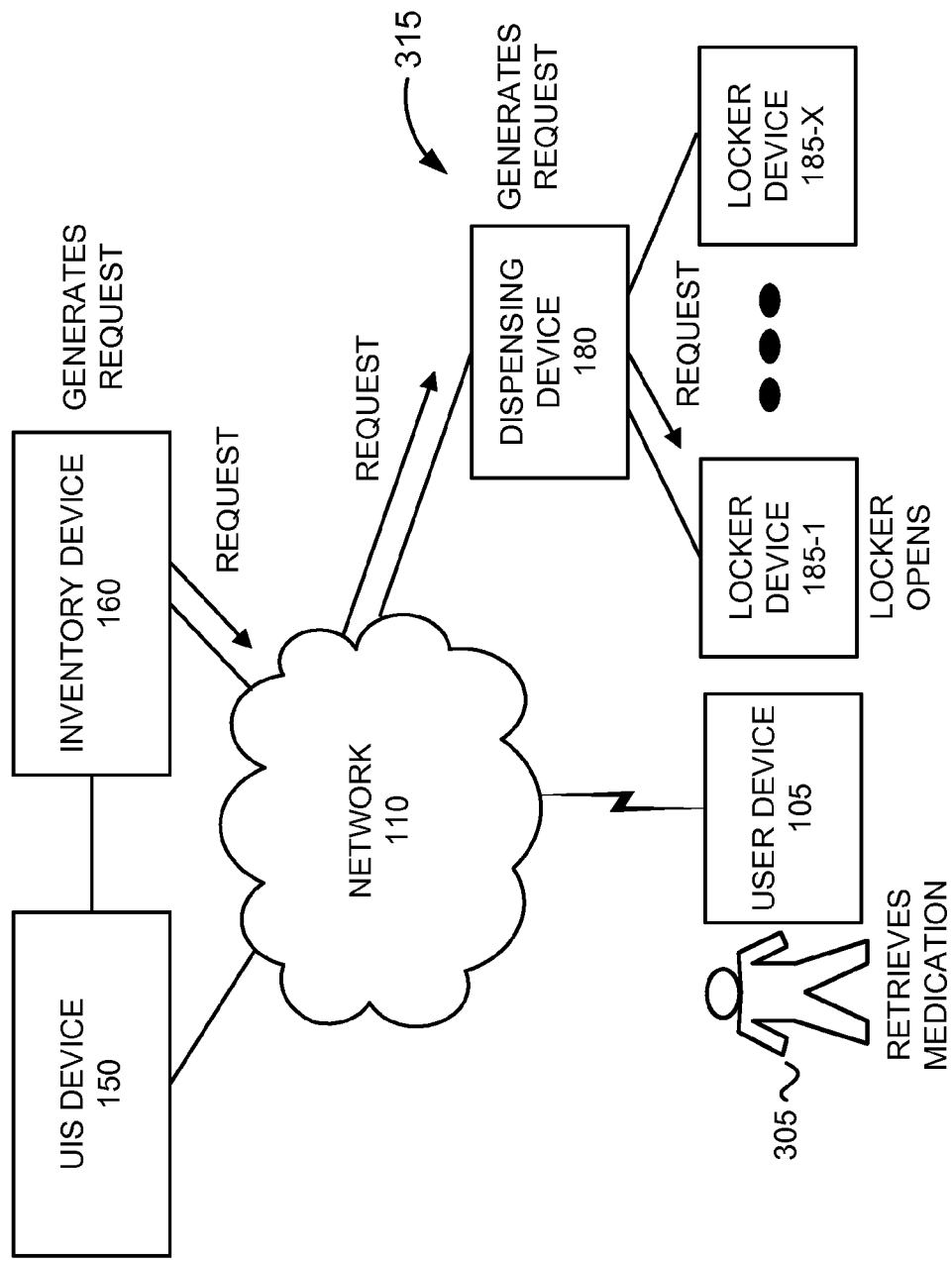

According to this example, when user 305 is in close proximity to locker 185, user device 105 transmits an acknowledgement to inventory device 160. The acknowledgement includes the location of user device 105 and a date and timestamp. Referring to FIG. 3F, in response to receiving the acknowledgement, inventory device 160 correlates existing information and determines whether to open locker 185. In this case, since all information is consistent and valid, inventory device 160 generates a request. The request indicates to dispensary system 315 to open locker 185. As illustrated, inventory device 160 transmits the request to dispensing device 180. In response to receiving the request, dispensing device 180 transmits a request to locker 185 (e.g., locker 185-1) which causes locker 185 to open. User 305 retrieves the medication from locker 185.

Figure 3G:
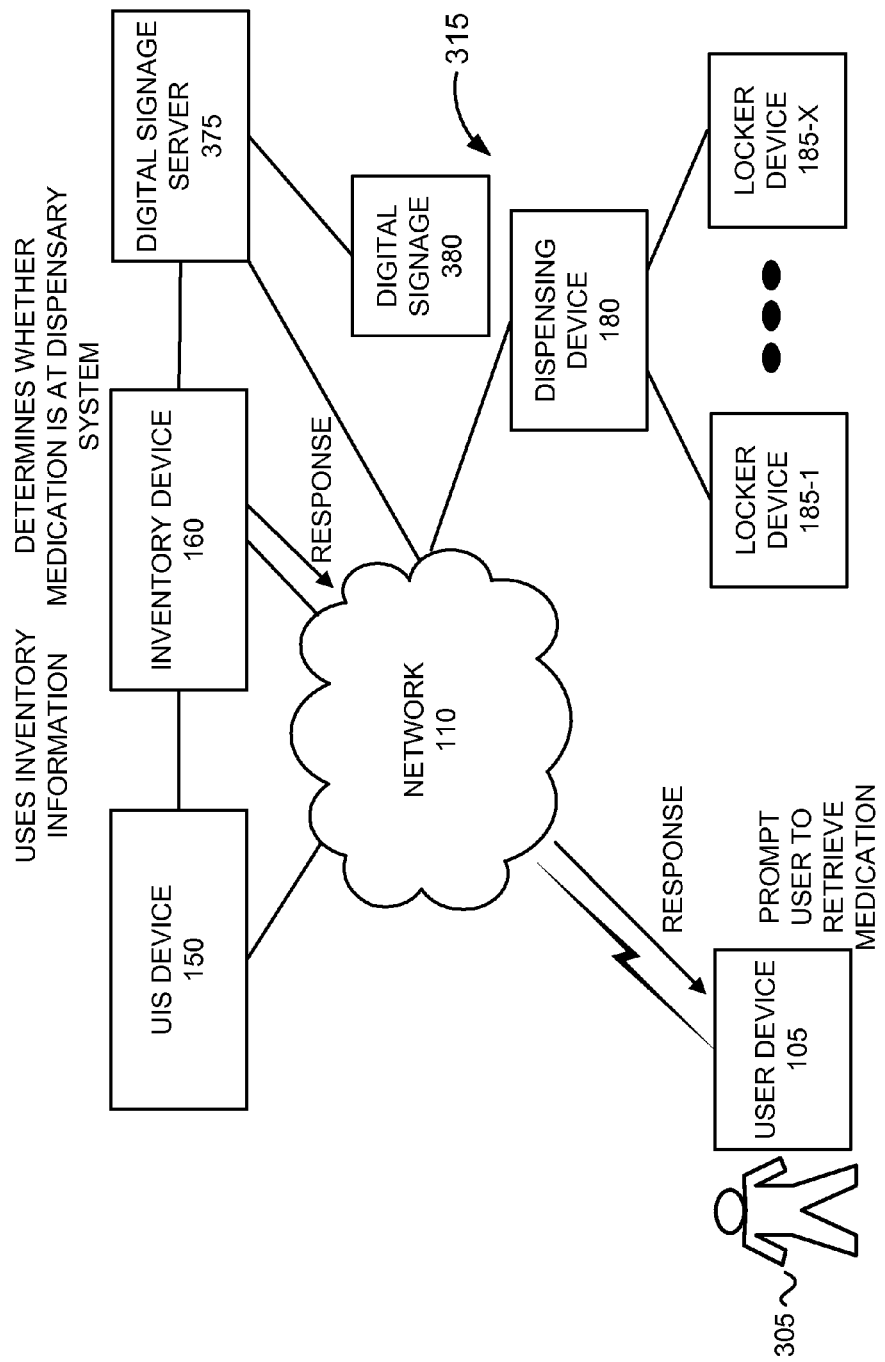

Although exemplary processes of the dispensing service have been described, in relation to distinct scenarios illustrated in FIGS. 3A-3F, according to other scenarios, processes different from those described may be performed. For example, referring to FIG. 3G, inventory device 160 may communicate with a digital signage server 375 to cause a display to present various messages. By way of further example, referring to FIG. 3G, if inventory device 160 determines that medication is not at dispensary system 315, inventory device 160 may communicate with digital signage server 375 to cause a digital signage 380 to present a particular message (e.g., "Use the Dispensary System In The Future," etc.), which may not be identifiably personal. Conversely, if inventory device 160 determines that the medication is at dispensary system 315, inventory device 160 may communicate with digital signage server 375 to cause digital signage 380 to present a particular message (e.g., "There Is A Package To Pick Up," etc.), which may not be identifiably personal. Additionally, or alternatively, messages may appear on user device 105, dispensing device 180, and/or locker device 185.

Figure 4A:
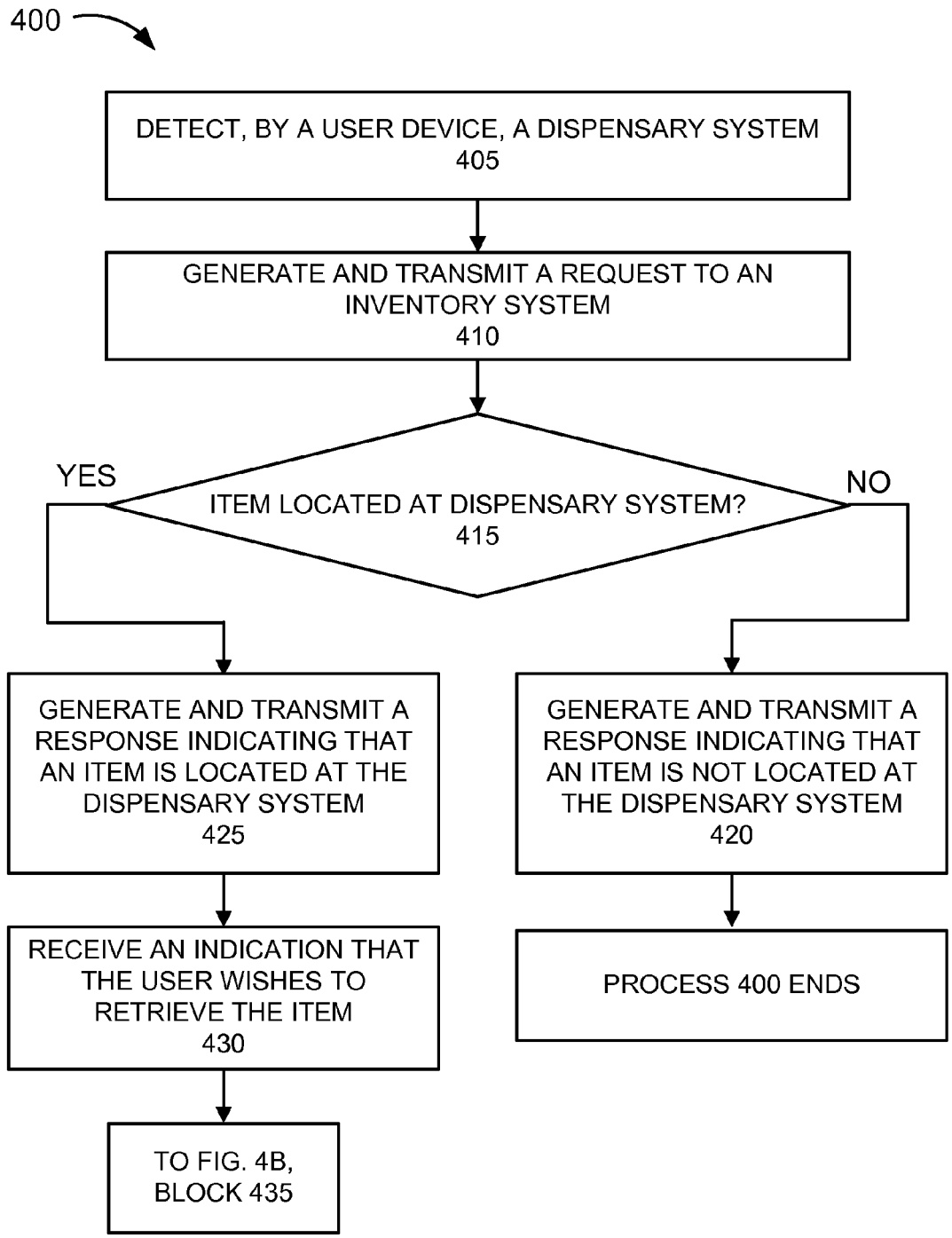
FIGS. 4A-4C are flow diagrams that illustrate an exemplary process pertaining to an exemplary embodiment of the dispensary service.
Figure 4B:
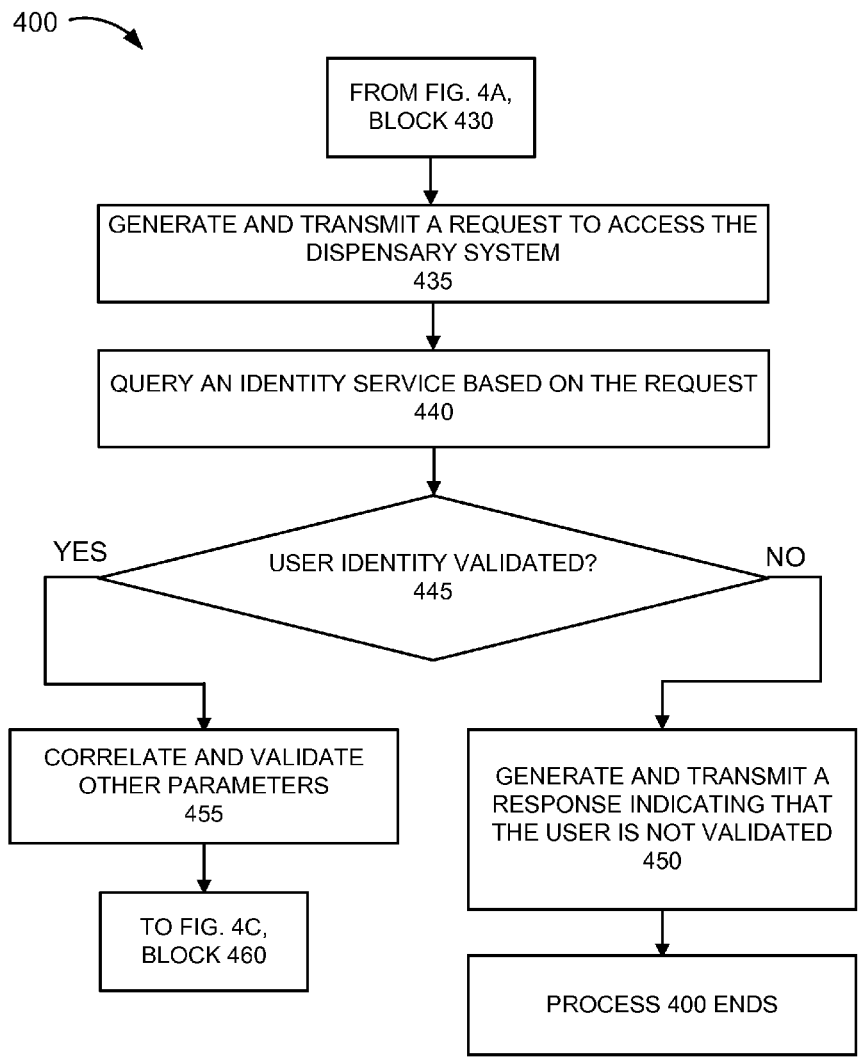
Figure 4C:
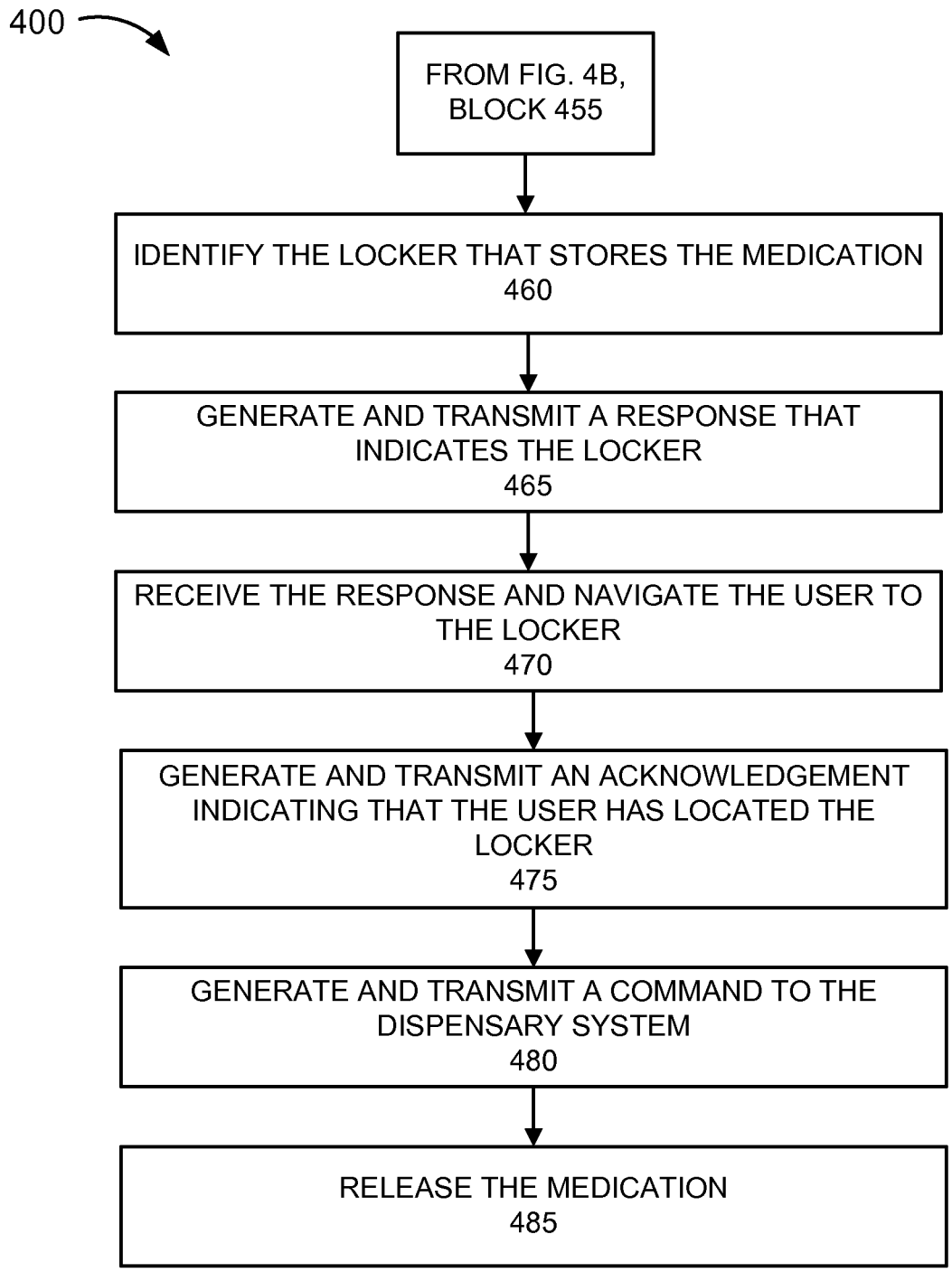

FIGS. 4A-4C are flow diagrams that illustrate an exemplary process 400 pertaining to an exemplary embodiment of the dispensary service. Process 400 is directed to a process previously described above with respect to FIGS. 3A-3F, and elsewhere in this description. According to an exemplary embodiment, user device 105, inventory device 160, and dispensary system 315 performs one or more of the steps described in process 400. For example, processor 205 executes software 215 to perform a step described.

Referring to FIG. 4A, process 400 begins, in block 405, by detecting a dispensary system. For example, user device 105 detects dispensary system 315 located at a particular location. By way of further example, dispensing system 315 wirelessly communicates with user device 105 using a beacon.

In block 410, a request for determining whether the dispensary system stores medication for a user of user device 105 is generated and transmitted. For example, in response to detecting dispensary system 315, user device 105 generates a request. The request may include a user identifier and the location of the user. The request includes, for example, a general request as to whether an item is located at dispensary system 315 on behalf of the user. User device 105 transmits the request to inventory device 160.

In block 415, it is determined whether an item for the user is located at the dispensary system. For example, based on the request received, inventory device 160 queries inventory information to determine whether dispensary system 315, which is located proximate to the user, stores an item on behalf of the user.

If it is determined that the dispensary system does not store the item (block 415-NO), then a response is transmitted to the user device indicating that the dispensary system does not store the item (block 420). For example, inventory device 160 generates and transmits a response to user device 105 that indicates dispensary system 315 does not store any item on behalf of the user. Based on the response, user device 105 may no longer listen to the beacon. User device 105 may also notify the user that dispensary system 315 does not store any item on behalf of the user. Process 400 ends.

If it is determined that the dispensary system stores the item (block 415—YES), then a response is transmitted to the user device indicating that the dispensary system does store the item (block 425). For example, inventory device 160 generates and transmits a response, to user device 105, that indicates dispensary system 315 stores an item on behalf of the user. Based on the response received, user device 105 may prompt the user to retrieve the item from dispensary system 315.

In block 430, an indication that the user wishes to retrieve the medication is received. For example, the user may provide an input to user device 105 that he/she wishes to retrieve the medication from dispensary system 315. Referring to FIG. 4B, a request to access the dispensary system is generated and transmitted (block 435). For example, the user scans, via user device 105, a session identifier. The user and/or user device 105 may obtain other information to generate the request, such as the user's name, age, access code to the identity service, location of user device 105, a beacon identifier, and/or a date and timestamp. The request is transmitted to inventory device 160.

In block 440, an identity service is queried based on the request. For example, in response to receiving the request, inventory device 160 queries UIS device 150 to validate the identity of the user. For example, the query includes information pertaining to the user, such as the user's name, age, and access code.

In block 445, it is determined whether the identity of the user is validated. For example, UIS device 150 uses the information included in the query to determine whether the user's identity can be validated. As previously described, according to an exemplary embodiment, users of the dispensary system have universal IDs and are subscribers to the identity service.

If it is determined that the user cannot be validated (block 445-NO), then a response is generated and transmitted to the user device indicating that the user cannot be validated (block 450). For example, inventory device 160 generates and transmits a response, to user device 105, that indicates that the identity service was unable to validate the user. User device 105 may notify the user that the identity service was unable to validate the user's identity. Process 400 ends.

If it is determined that the user is validated (block 445—YES), then other parameters are correlated and validated (block 455). For example, inventory device 160 correlates other parameters pertaining to the request (e.g., date, time, location of user device 105, location of dispensary system 315) and validates these parameters such that these parameters are consistent with the validated user being at dispensary system 315 at this time. In the event that all of the necessary parameters do not validate, process 400 would end (not illustrated). For example, inventory device 160 would generate and transmit a response indicating that the dispensary service is unavailable to the user. However, for purposes of description, assume that the all of the parameters are validated.

Referring to FIG. 4C, the locker that stores the medication is identified (block 460). For example, inventory device 160 queries the inventory information to determine the particular locker device 185 that stores the medication on behalf of the user. Inventory device 160 determines the particular locker device 185 based on the query.

In block 465, a response that indicates the locker is generated and transmitted. For example, inventory device 160 generates and transmits a response that indicates the particular locker device 185 that stores the medication.

In block 470, the response is received and the user is navigated to the locker. For example, user device receives the response and navigates the user near to the locker device 185 that stores the medication. For example, user device 105 may provide a user interface that guides the user towards the particular locker device 185 based on a micro-beacon transmitted by dispensary system 315.

In block 475, an acknowledgement that indicates that the user has located the locker is generated and transmitted. For example, user device 105 generates and transmits an acknowledgement to inventory device 160 indicating that the user has located the particular locker device 185. User device 105 may also transmit a message (e.g., as a part of the acknowledgement or a separate message) that indicates that the user wants to receive the package now. In this way, the particular locker 185 will not open when the user simply walks near locker 185 without an intention to retrieve the medication.

In block 480, a command to the dispensary system is generated and transmitted. For example, in response to receiving the acknowledgement, inventory device 160 generates and transmits a command to dispensing device 180. The command includes an indication to open the particular locker 185.

In block 485, the medication is released. For example, dispensing device 180 causes the particular locker 185 to open. The user retrieves the medication from locker 185.

Although FIGS. 4A-4C illustrate an exemplary traffic aggregation service process 500, according to other embodiments, process 400 may include additional operations, fewer operations, and/or different operations than those illustrated in FIGS. 4A-4C and described herein. For example, according to other scenarios in which the user knows that a particular dispensary system 315 stores medication on his/her behalf, blocks 405, 410, 415, and 425 may be omitted. Additionally, for example, there may be scenarios in which a proxy user may pick up an item. However, similar to that previously described, the proxy user may need to subscribe to the identity service and undergo the validation process pertaining to identity, location, etc.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4A-4C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 205, etc.), or a combination of hardware and software (e.g., software 215). The embodiments have been described without reference to the specific software code since the software code can be designed to implement the embodiments based on the description herein and commercially available software design environments/languages.

In the preceding specification, various embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 205) of a computational device. A non-transitory storage medium includes one or more of the storage mediums described in relation to memory/storage 210.

No element, act, or instruction described in the present application should be construed as critical or essential to the embodiments described herein unless explicitly described as such.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
storing, by a network device, inventory information pertaining to items stored in a dispensary system, wherein the dispensary system includes lockers that store items;
receiving, by the network device and from a user device associated with a user, a first request to retrieve one of the items from dispensary system, wherein the first request includes a session identifier that identifies a session between the user and the dispensary system, an identity of the user, and a first beacon identifier that identifies the dispensary system and is not a network address of the dispensary system;
verifying, by the network device, whether the session identifier, the identity of the user, and the first beacon identifier are valid;
validating, by the network device, the session identifier, the identity of the user, and the first beacon identifier in response to verifying that the session identifier, the identity of the user, and the first beacon identifier are valid;
determining, by the network device, which of the lockers of the dispensary system stores the one of the items based on the inventory information, in response to validating the session identifier, the identity of the user, and the first beacon identifier;
transmitting, by the network device and to the user via the user device, a first response indicating one of the lockers in which the one of the items is stored; and
transmitting, by the network device and to the dispensary system, a command to open the one of the lockers.

2. The method of claim 1, further comprising:
transmitting, by the dispensary system, a beacon that includes a second beacon identifier that identifies the network device and not the dispensary system;
receiving, by the user device, the beacon;
detecting, by the user device, a presence of the dispensary system based on the beacon; and
transmitting, by the user device and to the network device in response to the detecting, a second request that includes a location of the user and information indicating that the one of the items has been delivered or placed in the dispensary system, wherein the second request is transmitted before the first request.

3. The method of claim 2, further comprising:
receiving, by the network device, the second request;
determining, by the network device in response to receiving the second request, whether the one of the items is stored at the dispensary system based on the inventory information;
transmitting, by the network device and to the user device, a second response indicating that the one of the items is stored at the dispensary system in response to determining that the one of the items is stored at the dispensary system; and
receiving, by the user device and from the network device, the second response.

4. The method of claim 1, wherein the one of the items is medication, and wherein the user is a user to which the medication is prescribed or a proxy user.

5. The method of claim 1; further comprising:
transmitting, by the user device and to the network device; a message that indicates that the user has located the one of the lockers.

6. The method of claim 1, further comprising:
transmitting, by the network device and to another network device, a query directed to validating the identity of the user in response to the first request; and
receiving, by the network device and from the other network device, a response to the query that indicates that the identity of the user is validated; wherein the user is a subscriber to an identity service provided by the other network device.

7. The method of claim 1, further comprising:
navigating, by the user device; the user to the one of the lockers in response to receiving the first response.

8. A device comprising:
a communication interface;
a memory, wherein the memory stores instructions; and
a processor, wherein the processor executes the instructions to:
store inventory information pertaining to items stored in a dispensary system, wherein the dispensary system includes lockers that store items;
receive, via the communication interface and from a user device associated with a user, a first request to retrieve one of the items from the dispensary system, wherein the first request includes a session identifier that identifies a session between the user and the dispensary system, an identity of the user, and a first beacon identifier that identifies the dispensary system and is not a network address of the dispensary system;
verify whether the session identifier, the identity of the user, and the first beacon identifier are valid;
validate the session identifier, the identity of the user, and the first beacon identifier in response to a verification that the session identifier, the identity of the user, and the first beacon identifier are valid;
determine which of the lockers of the dispensary system stores the one of the items based on the inventory information, in response to the validation of the session identifier, the identity of the user, and the first beacon identifier;

transmit, via the communication interface and to the user device, a first response indicating one of the lockers in which the one of the items is stored; and transmit, via the communication interface and to the dispensary system, a command to open the one of the lockers.

9. The device of claim 8, wherein the processor further executes the instructions to:

receive, via the communication interface and from the user device, an acknowledgement to the first response indicating that the user has located the one of the lockers, wherein the acknowledgement includes a location of the user device and data indicating that the user wants to obtain the one of the items.

10. The device of claim 9, wherein the processor further executes the instructions to:

determine, in response to the receipt of the acknowledgement, whether to open the one of the lockers based on the location of the user device, the inventory information, and the data; and generate the command in response to a determination that the location of the user device correlates to the inventory information.

11. The device of claim 8, wherein the processor further executes the instructions to:

transmit, via the communication interface and to another network device, a query directed to validating the identity of the user in response to the first request; and receive, via the communication interface and from the other network device, a response to the query that indicates that the identity of the user is validated, wherein the user is a subscriber to an identity service provided by the other network device.

12. The device of 8, wherein the items include at least one of medication, a retail good, or mail.

13. The device of claim 8, wherein for one or more of the items, the inventory information includes a dispensary system identifier that identifies one or more dispensary systems in which one or more of the items are stored, information indicating one or more locations of the one or more dispensary systems, locker identifiers that identify lockers of the one or more dispensary systems, information indicating medications stored in the lockers of the one or more dispensary systems, information indicating users to which the medications belong, and information indicating proxy users that can pick up the medications on behalf of the users.

14. The device of claim 8, wherein the processor further executes the instructions to:

invalidate the session identifier, the identity of the user, and the first beacon identifier of the dispensary system in response to a verification that the identity of the user is not valid.

15. The device of claim 8, wherein the processor further executes the instructions to:

receive, via the communication interface and from the user device, a second request from the user to identify whether the dispensary system stores the one of the items on behalf of the user, wherein the second request is received before the first request; and transmit, via the communication interface and to the user device, a second response that indicates whether the dispensary systems stores the one of the items on behalf of the user.

16. A non-transitory, computer-readable storage medium storing instructions executable by a processor of a computational device, which when executed cause the computational device to:

store inventory information pertaining to items stored in a dispensary system, wherein the dispensary system includes lockers that store items;

receive a first request from a user via a user device to retrieve one of the items from the dispensary system, wherein the first request includes a session identifier that identifies a session between the user and the dispensary system, an identity of the user, and a first beacon identifier that identifies the dispensary system and is not a network address of the dispensary system;

verify whether the session identifier, the identity of the user, and the first beacon identifier are valid;

validate the session identifier, the identity of the user, and the first beacon identifier in response to a verification that the session identifier, the identity of the user, and the first beacon identifier are valid;

determine which of the lockers of the dispensary system stores the one of the items based on the inventory information, in response to the validation of the session identifier, the identity of the user, and the first beacon identifier;

transmit to the user device, a first response indicating one of the lockers in which the one of the items is stored; and transmit to the dispensary system, a command to open the one of the lockers.

17. The non-transitory, computer-readable storage medium of claim 16, further storing instructions executable by the processor of the computational device, which when executed cause the computational device to:

receive an acknowledgement to the first response from the user device indicating that the user has located the one of the lockers, wherein the acknowledgement includes a location of the user device and data indicating that the user wants to obtain the one of the items; and transmit the command to open the one of the lockers based on the acknowledgement.

18. The non-transitory, computer-readable storage medium of claim 16, further storing instructions executable by the processor of the computational device, which when executed cause the computational device to:

deny access to the user in response to an unsuccessful validation of the identity of the user.

19. The non-transitory, computer-readable storage medium of claim 16, further storing instructions executable by the processor of the computational device, which when executed cause the computational device to:

receive a second request from the user device to identify whether the dispensary system stores the one of the items on behalf of the user, wherein the second request is received before the first request;

use the inventory information to identify whether the dispensary system stores the one of the items; and transmit to the user device, a second response that indicates the dispensary systems stores the one of the items based on the use of the inventory information.

20. The non-transitory, computer-readable storage medium of claim 16, wherein for one or more of the items, the inventory information includes a dispensary system identifier that identifies one or more dispensary systems in which one or more of the items are stored, information indicating one or more locales of the one or more dispensary systems, locker identifiers that identify lockers of the one or more dispensary systems, information indicating medications stored in the lockers of the one or more dispensary systems, information indicating users to which the medications belong, and information indicating proxy users that can pick up the medications on behalf of the users.

\* \* \* \* \*